US012379684B2

(12) United States Patent
Seshita et al.

(10) Patent No.: US 12,379,684 B2

(45) Date of Patent: Aug. 5, 2025

(54) FIXING DEVICE AND IMAGE FORMING APPARATUS INCORPORATING THE SAME

(71) Applicants: Takuya Seshita, Kanagawa (JP); Takahiro Imada, Kanagawa (JP)

(72) Inventors: Takuya Seshita, Kanagawa (JP); Takahiro Imada, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 34 days.

(21) Appl. No.: 18/387,853

(22) Filed: Nov. 8, 2023

(65) Prior Publication Data

US 2024/0160132 A1 May 16, 2024

(30) Foreign Application Priority Data

Nov. 15, 2022 (JP) ................................ 2022-182541

(51) Int. Cl.
*G03G 15/20* (2006.01)

(52) U.S. Cl.
CPC ..... *G03G 15/2042* (2013.01); *G03G 15/2064* (2013.01); *G03G 2215/2025* (2013.01)

(58) Field of Classification Search
CPC ........... G03G 15/2017; G03G 15/2039; G03G 15/2042; G03G 15/2053; G03G 2215/2003
See application file for complete search history.

(56) References Cited

U.S. PATENT DOCUMENTS

| | | | | |
|---|---|---|---|---|
| 2007/0217819 A1* | 9/2007 | Sone | G03G 15/2039 399/122 |
| 2012/0243889 A1* | 9/2012 | Saito | H01H 37/54 399/33 |
| 2015/0261151 A1 | 9/2015 | Ishigaya et al. | |
| 2023/0040825 A1* | 2/2023 | Park | G03G 15/2017 |

FOREIGN PATENT DOCUMENTS

| | | |
|---|---|---|
| JP | 2004-014129 A | 1/2004 |
| JP | 2006-195324 A | 7/2006 |
| JP | 2007286373 A * | 11/2007 |
| JP | 2013-148809 A | 8/2013 |
| JP | 2015-175959 A | 10/2015 |
| JP | 2015-210406 A | 11/2015 |

OTHER PUBLICATIONS

JP 2007286373 English machine translation, Nanjo et al., Nov. 1, 2007 (Year: 2007).*

* cited by examiner

*Primary Examiner* — Thomas S Giampaolo, II

(74) *Attorney, Agent, or Firm* — XSENSUS LLP

(57) ABSTRACT

A fixing device includes a fixing rotator, a pressure rotator, a heater, a temperature responsive element, and a fastener. The pressure rotator presses the fixing rotator to form a fixing nip between the fixing rotator and the pressure rotator. The heater heats the fixing rotator. The temperature responsive element is exposed outside the fixing device and fixed to the fastener. The fastener is exposed outside the fixing device.

13 Claims, 8 Drawing Sheets

FIXING DEVICE AND IMAGE FORMING APPARATUS INCORPORATING THE SAME

CROSS-REFERENCE TO RELATED APPLICATION

This patent application is based on and claims priority pursuant to 35 U.S.C. § 119(a) to Japanese Patent Application No. 2022-182541, filed on Nov. 15, 2022, in the Japan Patent Office, the entire disclosure of which is hereby incorporated by reference herein.

BACKGROUND

Technical Field

Embodiments of the present disclosure generally relate to a fixing device and an image forming apparatus incorporating the fixing device.

RELATED ART

As known in the art, a fixing device in an image forming apparatus includes a fixing rotator, a pressure rotator pressing the fixing rotator to form a fixing nip, a heat source to heat the fixing rotator, and multiple temperature responsive elements. One of the multiple temperature responsive elements performs an operation corresponding to the temperature of the fixing rotator. Another temperature responsive element outputs a voltage or a current corresponding to the temperature of the fixing rotator.

SUMMARY

This specification describes an improved fixing device that includes a fixing rotator, a pressure rotator, a heater, a temperature responsive element, and a fastener. The pressure rotator presses the fixing rotator to form a fixing nip between the fixing rotator and the pressure rotator. The heater heats the fixing rotator. The temperature responsive element is exposed outside the fixing device and fixed to the fastener. The fastener is exposed outside the fixing device.

This specification also describes an image forming apparatus including the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
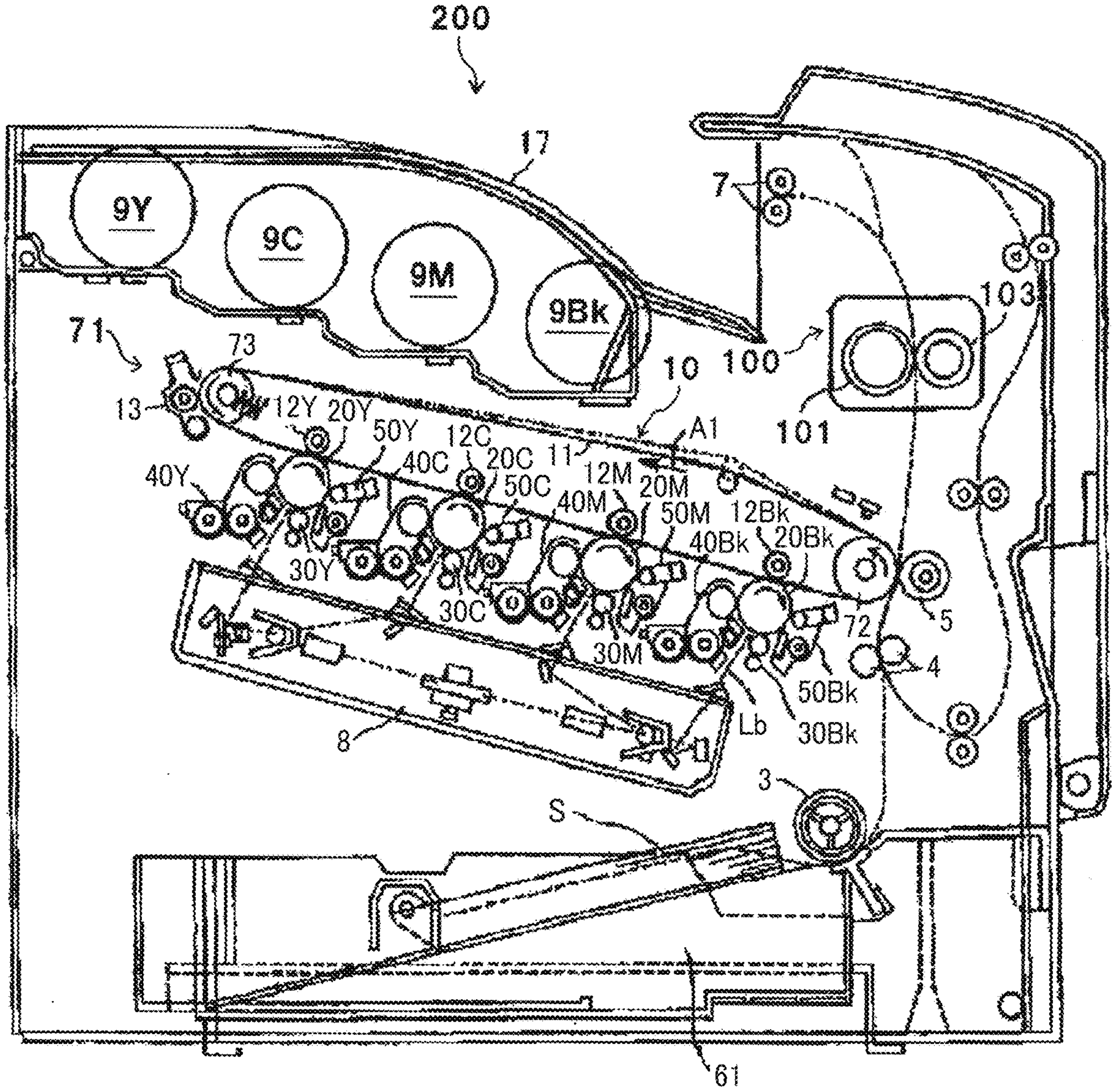
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

The following describes an electrophotographic image forming apparatus 200 according to an embodiment of the present disclosure. First, a schematic configuration of the image forming apparatus 200 is described. FIG. 1 is a schematic diagram illustrating a configuration of the image forming apparatus 200. The image forming apparatus 200 illustrated in FIG. 1 is a color image forming apparatus employing a tandem system in which multiple image forming devices to form toner images in multiple colors, respectively, are aligned in a stretch direction of a belt. The image forming apparatus 200 may employ other systems and may be a copier, a facsimile machine, a printer, a multifunction peripheral or a multifunction image forming apparatus (MFP) having at least one of copying, printing, scanning, facsimile, and plotter functions.

The image forming apparatus 200 includes four image stations serving as image forming devices including photoconductor drums 20Y, 20C, 20M, and 20Bk and an optical writing device 8 serving as an optical writing device disposed below the four image stations so as to face the four image stations. Additionally, the image forming apparatus 200 includes an intermediate transfer belt unit 10 disposed above and opposite to the four image stations.

In the four image stations, photoconductor drums 20Y, 20C, 20M, and 20Bk are aligned in this order in the rotation direction A1 of the intermediate transfer belt 10. The photoconductor drums 20Y, 20C, 20M, and 20Bk form the yellow, cyan, magenta, and black toner images, respectively. Each of the photoconductor drums 20Y, 20C, 20M, and 20Bk is surrounded by image forming components that form the yellow, cyan, magenta, and black toner images on the photoconductor drums 20Y, 20C, 20M, and 20Bk as the photoconductor drums 20Y, 20C, 20M, and 20Bk rotate clockwise in FIG. 1. For example, the photoconductor drum 20Bk on which the black toner image is formed is surrounded by a charger 30Bk, a developing device 40Bk, a primary transfer roller 12Bk, and a cleaning device 50Bk in a rotation direction of the photoconductor drum 20Bk, which perform image formation processing. Similarly, the image forming apparatus 200 includes chargers 30Y, 30C, and 30M, developing devices 40Y, 40C, and 40M, primary transfer rollers 12Y, 12C, and 12M, and cleaning devices 50Y, 50C, and 50M.

The optical writing device 8 includes a semiconductor laser serving as a light source, a coupling lens, an fθ lens, a toroidal lens, a deflection mirror, and a polygon mirror serving as a deflector.

The optical writing device 8 emits writing light Lb corresponding to each color to each of the photoconductor drums 20Y, 20C, 20M, and 20Bk to form an electrostatic latent image on each of the photoconductor drums 20Y, 20C, 20M, and 20Bk.

The intermediate transfer belt unit 10 includes a drive roller 72 and a driven roller 73 around which the intermediate transfer belt 11 as an intermediate transferor is wound, in addition to the intermediate transfer belt 11 and the primary transfer rollers 12Y, 12C, 12M, and 12Bk. The driven roller 73 also serves as a tension applicator that applies tension to the intermediate transfer belt 11. A biasing member such as a spring biases the driven roller 73 against the intermediate transfer belt 11.

The image forming apparatus 200 further includes a secondary transfer roller 5 serving as a transferor and an intermediate transfer cleaning device 13. The secondary transfer roller 5 is disposed to face the intermediate transfer belt 11 and is driven by the intermediate transfer belt 11 to rotate together with the intermediate transfer belt 11. The intermediate transfer cleaning device 13 is disposed to face the intermediate transfer belt 11 and cleans the surface of the intermediate transfer belt 11.

The intermediate transfer cleaning device 13 includes a cleaning brush and a cleaning blade that are disposed so as to be in contact with the intermediate transfer belt 11. The cleaning brush and the cleaning blade scrape and remove foreign matter such as residual toner on the intermediate transfer belt 11 to clean the intermediate transfer belt 11.

The intermediate transfer cleaning device 13 further includes a waste toner conveyer to convey the residual toner removed from the intermediate transfer belt 11.

A transfer device 71 includes the intermediate transfer belt unit 10, the primary transfer rollers 12Y, 12C, 12M, and 12Bk, the secondary transfer roller 5, and the intermediate transfer cleaning device 13.

The sheet feeding device 61 is at a lower part of the body of the image forming apparatus 200 and stores sheets S as recording media. The sheet feeding device 61 includes a feeding roller 3 to contact an upper face of an uppermost sheet S. The feeding roller 3 is driven to rotate counterclockwise in FIG. 1 to feed the uppermost sheet S toward a registration roller pair 4.

The registration roller pair 4 conveys a sheet S conveyed from the sheet feeding device 61 to the secondary transfer nip at a predetermined time when the yellow, cyan, magenta, and black toner images superimposed on the intermediate transfer belt reach the secondary transfer nip. At the secondary transfer nip, a toner image formed by superimposing the yellow, cyan, magenta, and black toner images is transferred from the intermediate transfer belt to the sheet S. The image forming apparatus 200 further includes a sensor to detect a leading edge of the sheet S that reaches the registration roller pair 4.

The image forming apparatus 200 includes a fixing device 100 employing a contact heating system to fix the toner image constructed of the yellow, cyan, magenta, and black toner images onto the sheet P as a fixing target. The image forming apparatus 200 further includes an output roller pair 7 and an output tray 17. The output roller pair 7 ejects the sheet S onto which the toner image is fixed to the outside of the main body of the image forming apparatus 200. The output tray 17 is disposed on the upper face of the main body of the image forming apparatus 200. The sheet ejected to the outside of the main body of the image forming apparatus 200 is stacked on the output tray 17. The image forming apparatus 200 includes toner bottles 9Y, 9C, 9M, and 9Bk that are situated below the output tray 17 and replenished with fresh yellow, cyan, magenta, and black toners, respectively.

The image forming apparatus 200 performs the following image forming operations. Visible images are formed on the photoconductor drums 20Y, 20C, 20M, and 20Bk in the four image forming stations. In a primary transfer process, the primary transfer roller 12Y, 12M, 12C, and 12Bk primarily transfer the yellow, cyan, magenta, and black toner images formed on the photoconductor drums 20Y, 20C, 20M, and 20Bk, respectively, as visible images successively onto the intermediate transfer belt 11 contacting the photoconductor drums 20Y, 20C, 20M, and 20Bk and moving in the direction indicated by the arrow A1. As a result, the yellow, cyan, magenta, and black toner images are superimposed on the intermediate transfer belt 11. The secondary transfer roller 5 performs a secondary transfer process. In the secondary transfer process, the yellow, cyan, magenta, and black toner images that are superimposed and transferred onto the intermediate transfer belt 11 are collectively transferred onto the sheet S. The fixing device 100 fixes the yellow, cyan, magenta, and black toner images onto the sheet S. The output roller pair 7 ejects the sheet S onto which the above-described toner images are fixed to the outside of the main body of the image forming apparatus 200. As described above, the image forming stations, the intermediate transfer belt, and the secondary transfer roller functions as an image forming section to form an image on a recording medium.

Figure 2:
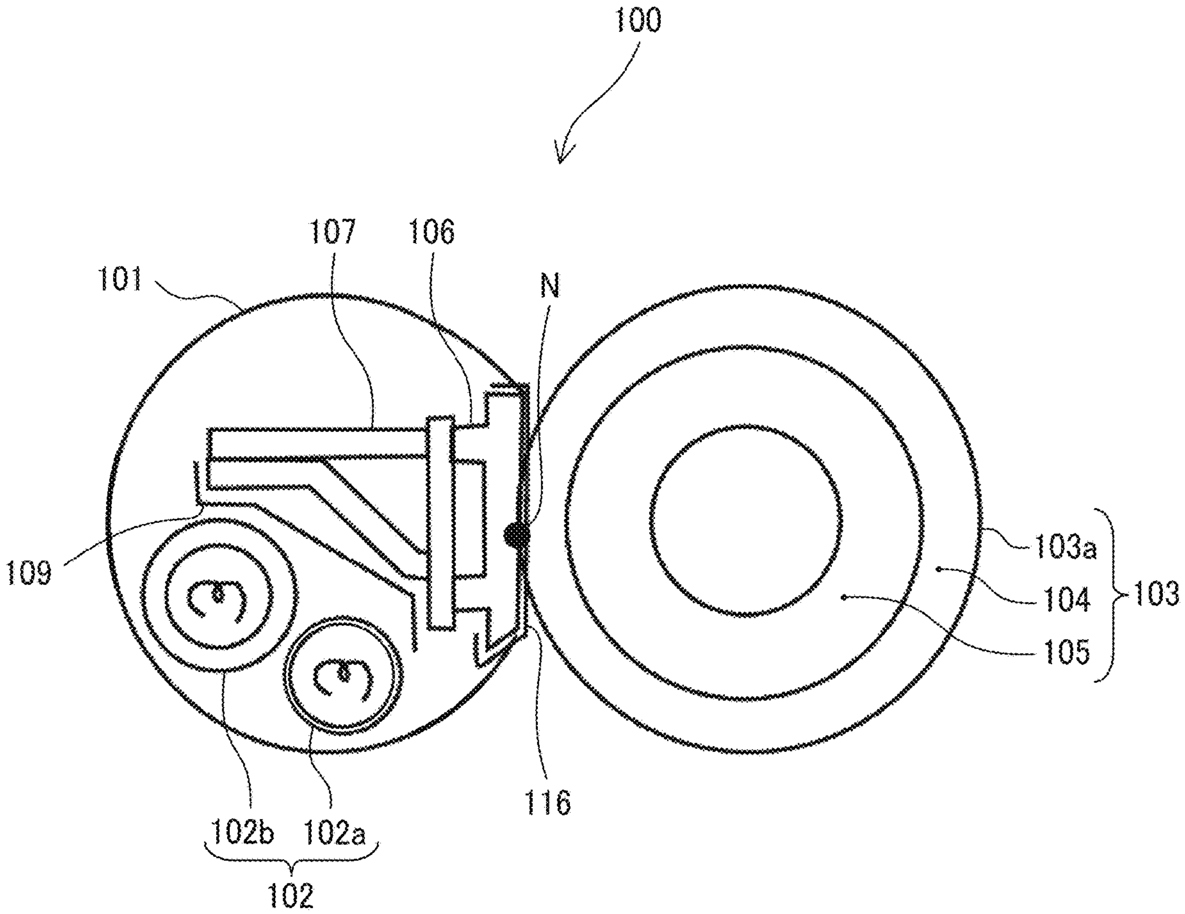
FIG. 2 is a diagram illustrating a schematic configuration of a fixing device according to the embodiment of the present disclosure.

FIG. 2 is a diagram illustrating a schematic configuration of the fixing device 100. The fixing device 100 includes a fixing belt 101 having an endless shape as a fixing rotator and a pressure roller 103 as a pressure rotator facing and contacting the fixing belt 101. The fixing device 100 includes a heater unit 102 including a main heater 102*a* and a sub-heater 102*b*, a pad 106 as a nip formation pad, and a support 107 that are inside the loop of the fixing belt 101. In addition, the fixing device 100 includes a reflector 109 that a reflection plate and a slide aid 116 that are inside the loop of the fixing belt 101. Each of the main heater 102*a*, the sub-heater 102*b*, the pad 106, the support 107, and the slide aid 116 that are inside the loop of the fixing belt 101 has a length that is equal to or greater than a length of the fixing belt 101 in a width direction of the fixing belt 101. In FIG.

2, the sheet S is conveyed from bottom to top, and the fixing belt 101 rotates counterclockwise in FIG. 2.

The fixing belt 101 is an endless belt or film made of metal such as nickel and stainless used steel (SUS) or a resin material such as polyimide. The fixing belt 101 includes a base layer and a release layer. The release layer serves as a surface layer made of perfluoroalkoxy alkane (PFA) or polytetrafluoroethylene (PTFE), facilitating separation of toner of the toner image on the sheet P from the fixing belt 101 and preventing the toner from adhering to the fixing belt 101. Optionally, an elastic layer made of silicone rubber may be interposed between the base layer made of nickel or SUS and the release layer. As the elastic layer deforms, the elastic layer absorbs the slight surface asperities, preventing the orange peel mark on the toner image. The fixing belt 101 may include a high thermal conduction layer as a metal layer made of copper or nickel having a high thermal conductivity between the base layer and the elastic layer. The high thermal conduction layer can transfer heat in the width direction of the fixing belt, which can uniform the temperature distribution of the fixing belt in the width direction.

The pressure roller 103 includes a core metal 105, an elastic rubber layer 104, and a release layer 103*a*. The elastic rubber layer 104 is disposed on the core metal 105. The release layer serves as a surface layer that facilitates separation of the sheet P from the pressure roller 103. The release layer is made of PFA or PTFE. A driving force is transmitted to the pressure roller 103 from a driver such as a motor disposed in the image forming apparatus 200 through a gear, thus rotating the pressure roller 103. A spring presses the pressure roller 103 against the fixing belt 101, and the elastic rubber layer 104 is compressed and deformed so that the fixing nip N has a predetermined nip width. Alternatively, the pressure roller 103 may be a hollow roller. A heater such as a halogen heater may be disposed inside the pressure roller 103 as the hollow roller.

The pad 106 serving as a nip formation pad is disposed inside the loop of the fixing belt 101. The pad 106 is disposed opposite the pressure roller 103 via the fixing belt 101 to form a fixing nip N between the fixing belt 101 and the pressure roller 103. The slide aid 116 is disposed on the pad 106. The inner face of the fixing belt 101 slides on the slide aid 116. The support 107 supports the pad 106. The support 107 prevents the pad 106 from being bent by pressure received from the pressure roller 103, attaining a uniform length of the fixing nip N in a sheet conveyance direction throughout an entire span of the fixing belt 101 in the axial direction of the pressure roller 103.

Each of the main heater 102*a* and the sub-heater 102*b* is a halogen heater. The main heater 102*a* and the sub-heater 102*b* disposed opposite the inner face of the fixing belt 101 heat the fixing belt 101 directly with radiant heat. Alternatively, each of the main heater 102*a* and the sub-heater 102*b* may be an induction heater (IH), a resistive heat generator, a carbon heater as long as the main heater 102*a* and the sub-heater 102*b* heat the fixing belt 101.

The main heater 102*a* has a heat generation distribution in which the heat generation amount at the center in the width direction of the sheet is larger than the heat generation amount at each of both ends in the width direction. On the other hand, the sub-heater 102*b* has a heat generation distribution in which the heat generation amount at each of both ends in the width direction is larger than the heat generation amount at the center in the width direction.

The fixing device according to the present embodiment includes the reflector 109 disposed between the main heater 102*a* and the support 107 and between the sub-heater 102*b* and the support 107. Instead of the reflector 109, a surface of the support 107 may be treated with thermal insulation or specular surface finish to attain similar advantages.

The fixing belt 101 rotates in accordance with rotation of the pressure roller 103. In the fixing device 100 illustrated in FIG. 2, as the driver drives and rotates the pressure roller 103, the driving force is transmitted from the pressure roller 103 to the fixing belt 101 at the fixing nip N, rotating the fixing belt 101 in accordance with rotation of the pressure roller 103. Heat and pressure in the fixing nip N fix the toner image formed on the sheet P onto the sheet P.

The fixing device 100 includes a power interrupter 120 disposed outside the fixing belt 101. The power interrupter interrupts power supply to the sub-heater 102*b* and the main heater 102*a* when the power interrupter detects an abnormal temperature of the surface of the fixing belt 101.

Figure 3:
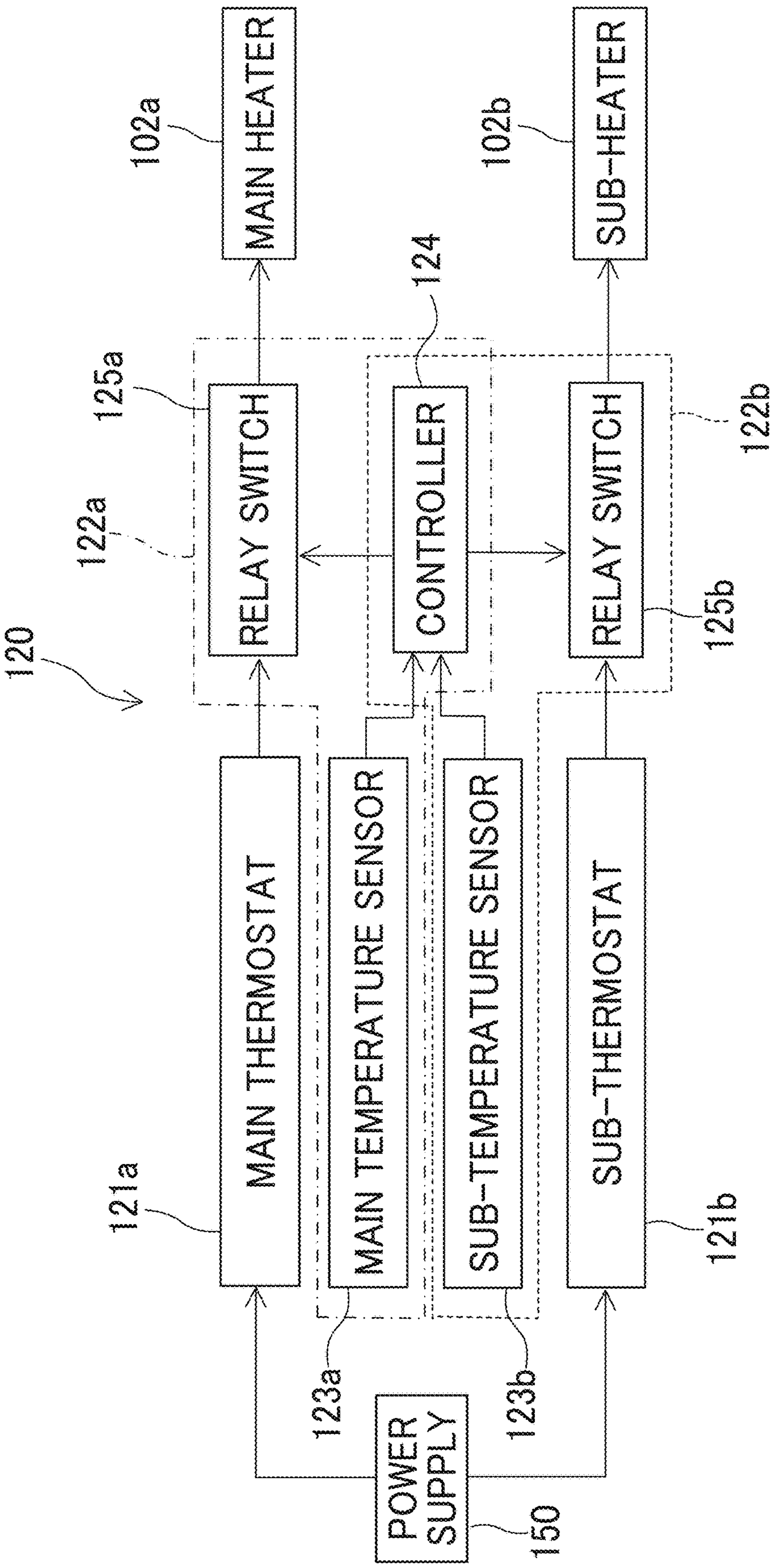
FIG. 3 is a block diagram of a power interrupter.

FIG. 3 is a block diagram of the power interrupter 120.

The power interrupter 120 includes a main thermostat 121*a* as a first main protector to interrupt power supply to the main heater 102*a* and a second main protector 122*a*. In addition, the power interrupter 120 includes a sub-thermostat 121*b* as a first sub-protector to interrupt power supply to the sub-heater 102*b* and a second sub-protector 122*b*.

The main thermostat 121*a* is a temperature responsive element and works as a protection element. The main thermostat 121*a* is disposed in a main electric circuit to supply electric power of a power supply 150 to the main heater 102*a*. The main thermostat 121*a* cuts off power supply to the main heater 102*a* in response to the temperature of the fixing belt 101 equal to or higher than a predetermined temperature. The predetermined temperature is typically higher than the temperature of the fixing belt 101 in the normal operation of the fixing device and is set so as not to adversely affect the fixing belt 101 and its surrounding components.

The sub-thermostat 121*b* is the temperature responsive element and works as the protection element. The sub-thermostat 121*b* is disposed in a sub-electric circuit to supply electric power of the power supply 150 to the sub-heater 102*b*. The sub-thermostat 121*b* cuts off power supply to the sub-heater 102*b* in response to the temperature of the fixing belt 101 equal to or higher than a predetermined temperature.

The second main protector 122*a* includes a main temperature sensor 123*a* that is the temperature responsive element, a controller 124 as circuitry, and a relay switch 125*a*. The relay switch 125*a* is in the main electric circuit. In response to receiving a signal of the main temperature sensor 123*a* that detects the temperature of the fixing belt 101 equal to or higher than the predetermined temperature, the controller 124 turns off the relay switch 125*a* to cut off the power supply to the main heater 102*a*.

The second sub-protector 122*b* includes a sub-temperature sensor 123*b* that is the temperature responsive element, the controller 124, and a relay switch 125*b*. The relay switch 125*b* is in the sub-electric circuit. In response to receiving a signal from the sub-temperature sensor 123*b* that detects the temperature of the fixing belt 101 equal to or higher than the predetermined temperature, the controller 124 turns off the relay switch 125*b* to cut off the power supply to the sub-heater 102*b*.

The power interrupter 120 in the present embodiment includes two protectors for one heater. Even if one of the two protectors fails, the other protector can perform a function to cut off the power supply to the heater. The above-described power interrupter can more preferably protect the fixing device than a power interrupter including one protector for one heater.

The power interrupter in the present embodiment includes the protector including the thermostat and the protector including the temperature sensor for one heater, but a combination of the protectors is not limited thereto. For example, the power interrupter may include a combination of the protector including the thermostat and a protector including a temperature fuse, a combination of the protector including the thermostat and the protector including the thermostat, or a combination of the protector including the temperature fuse and the protector including the temperature sensor, which may be appropriately combined depending on the configuration of the fixing device.

The protector including the temperature sensor can cut off the power supply to the heater when the temperature sensor detects the temperature equal to or higher than the predetermined temperature. The protector including the temperature sensor cuts off the power supply to the heater faster than the protector including the thermostat or the temperature fuse after the temperature of the fixing belt 101 is equal to or higher than the predetermined temperature. In particular, the fixing device in which the energy saving capacity is enhanced includes the fixing belt 101 having a small thermal capacity, and the temperature of the fixing belt 101 rapidly rises. It is preferable that the power interrupter cuts off the power supply to the heater faster after the temperature of the fixing belt reaches or exceeds the predetermined temperature.

Accordingly, the power interrupter in which at least one of the two protectors includes the temperature sensor is preferable because the power interrupter including at least one temperature sensor can quickly cut off the power supply to the heater after the temperature of the fixing belt 101 reaches the predetermined temperature or higher.

Figure 4A:
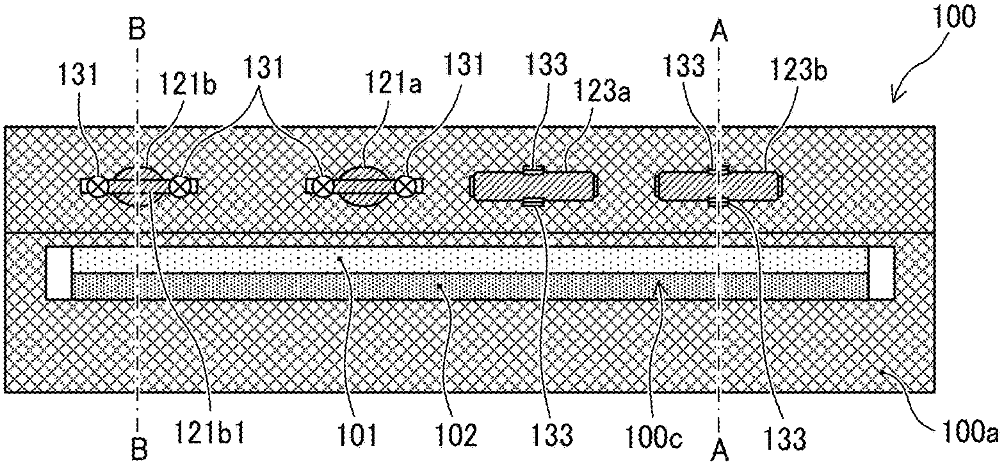
FIG. 4A is a bottom view of the fixing device.
Figure 4B:
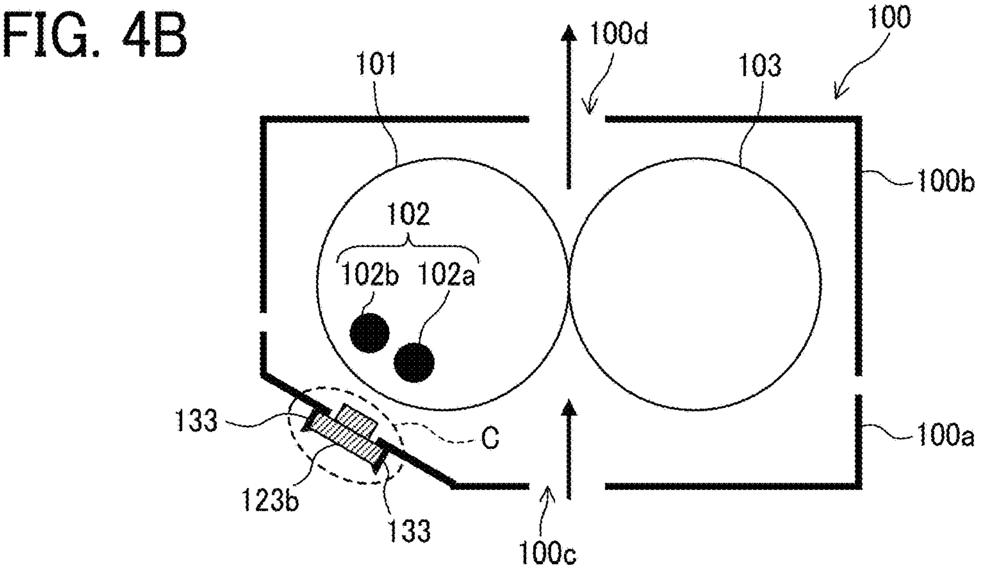
FIG. 4B is a cross-sectional view of the fixing device, taken along a line A-A in FIG. 4A.
Figure 4C:
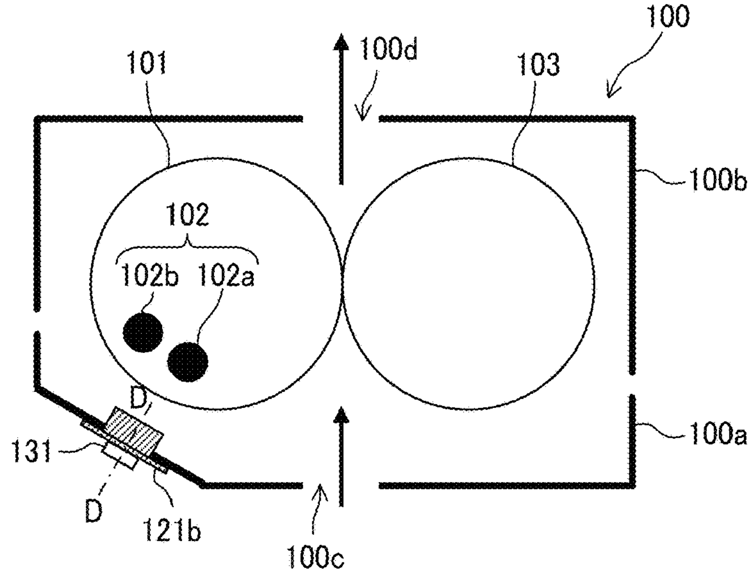
FIG. 4C is a cross-sectional view of the fixing device, taken along a line B-B in FIG. 4A.

FIG. 4A is a bottom view of the fixing device 100. In other words, FIG. 4A is a schematic view of the fixing device 100 viewed from a point upstream from the fixing device in a conveyance direction of the sheet S. FIG. 4B is a cross-sectional view of the fixing device 100 taken along a line A-A in FIG. 4A. FIG. 4C is a cross sectional view of the fixing device 100 taken along a line B-B in FIG. 4A.

The fixing device 100 includes a bottom cover 100*a* and a top cover 100*b* which are resin-molded products covering the fixing belt 101 and the pressure roller 103. The bottom cover 100*a* has an entrance 100*c* to which the sheet S is conveyed after the sheet passes through the secondary transfer nip, and the top cover 100*b* has an exit 100*d* from which the sheet is ejected after the toner image is fixed onto the sheet S.

The main thermostat 121*a*, the sub-thermostat 121*b*, the main temperature sensor 123*a*, and the sub-temperature sensor 123*b* as temperature responsive elements of the power interrupter 120 are assembled to the bottom cover 100*a*. It is preferable that the main thermostat 121*a*, the sub-thermostat 121*b*, the main temperature sensor 123*a*, and the sub-temperature sensor 123*b* detect abnormalities earlier. For this reason, the main thermostat 121*a*, the sub-thermostat 121*b*, the main temperature sensor 123*a*, and the sub-temperature sensor 123*b* are arranged to face a portion in which the surface temperature of the fixing belt 101 is typically highest. Specifically, the main thermostat 121*a*, the sub-thermostat 121*b*, the main temperature sensor 123*a*, and the sub-temperature sensor 123*b* are arranged so as to face regions of the fixing belt 101 that are closer to the heaters 102*a* and 102*b* than other regions of the fixing belt 101.

As described above, the main heater 102*a* has the heat generation distribution in which the heat generation amount at the center in the width direction of the sheet is larger than the heat generation amount at both ends in the width direction, and the sub-heater 102*b* has the heat generation distribution in which the heat generation amount at both ends in the width direction is larger than the heat generation amount at the center. For this reason, the sub-thermostat 121*b* and the sub-temperature sensor 123*b* are disposed on both ends of the bottom cover 100*a* in the axial direction, and the main thermostat 121*a* and the main temperature sensor 123*a* are disposed at the center of the bottom cover 100*a*.

As illustrated in FIGS. 4A and 4B, the main temperature sensor 123*a* and the sub-temperature sensor 123*b* are assembled to the bottom cover 100*a* by snap-fitting. On the other hand, the main thermostat 121*a* and the sub-thermostat 121*b* are assembled to the bottom cover 100*a* by screws 131. Fixing the main temperature sensor 123*a* and the sub-temperature sensor 123*b* by snap-fitting enables easily assembling the main temperature sensor 123*a* and the sub-temperature sensor 123*b* to the bottom cover 100*a* with an inexpensive configuration.

Figure 5:
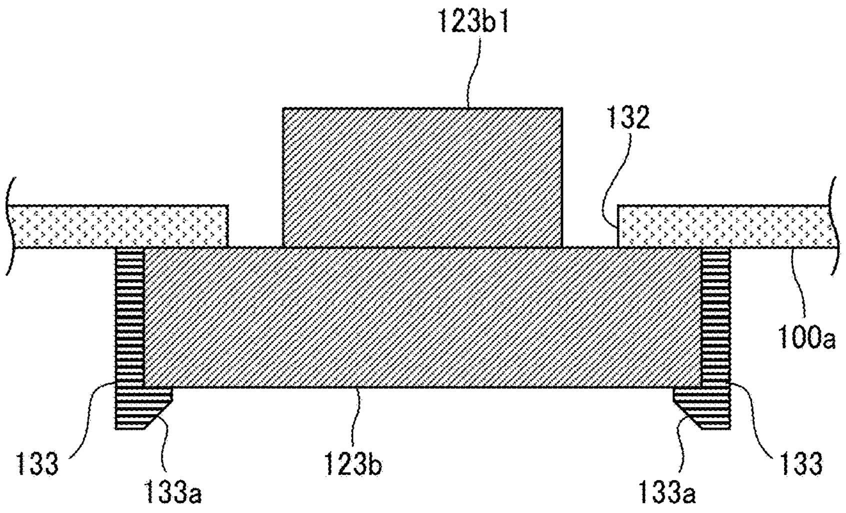
FIG. 5 is an enlarged view of a portion C in FIG. 4B.

FIG. 5 is an enlarged view of a portion C in FIG. 4B.

As illustrated in FIG. 5, the bottom cover 100*a* has a through-hole 132 through which a detector 123*a*1 of the sub-temperature sensor 123*b* passes. In addition, a pair of elastic fasteners 133 are disposed on the bottom cover 100*a* so as to extend outward from positions slightly away from the through-hole 132. The elastic fastener 133 includes a claw 133*a* at a tip of the elastic fastener 133. One of the pair of elastic fasteners 133 may include the claw 133*a*.

Inserting a detector 123*b*1 into the through-hole 132 causes the sub-temperature sensor 123*b* to elastically deform the tips of the elastic fasteners 133 in a lateral direction in FIG. 5. Butting the sub-temperature sensor 123*b* against the bottom cover 100*a* positions the sub-temperature sensor 123*b* inside the claws 133*a* of the elastic fasteners 133. As a result, the elastic fasteners 133 are restored, and the sub-temperature sensor 123*b* is sandwiched and fixed by the bottom cover 100*a* and the claw 133*a*.

The main temperature sensor 123*a* is also assembled to the bottom cover 100*a* in the same manner as the sub-temperature sensor 123*b*. In other words, a part of the main temperature sensor 123*a* and a part of the sub-temperature sensor 123*b* are on the outer face of the fixing device 100.

Figure 6:
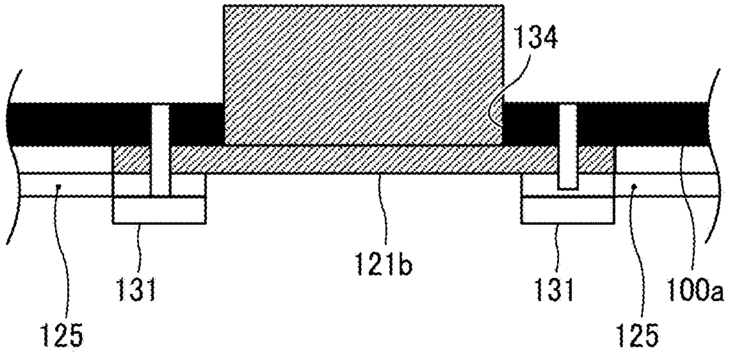
FIG. 6 is a cross-sectional view of the fixing device, taken along a line D-D in FIG. 4C.

FIG. 6 is a cross-sectional view of the fixing device, taken along a line D-D in FIG. 4C.

As illustrated in FIG. 6, the bottom cover 100*a* has a fitting hole 134 to fit the sub-thermostat 121*b*. Fitting the sub-thermostat 121*b* into the fitting hole 134 and butting a flange-shaped portion of the sub-thermostat 121*b* against the bottom cover 100*a* temporarily assembles the sub-thermostat 121*b* to the bottom cover 100*a*. Subsequently, screwing the screws 131 into the screw holes of the bottom cover 100*a* fixes connection terminals of the sub-thermostat 121*b* on electric cables 125 and assembles the sub-thermostat 121*b* to the bottom cover 100*a*.

The main thermostat 121*a* is also assembled to the bottom cover 100*a* in the same manner as the sub-thermostat 121*b*. Alternatively, the main thermostat 121*a* and the sub-thermostat 121*b* may be assembled to the bottom cover 100*a* by snap-fitting in the same manner as the main temperature sensor 123*a* and the sub-temperature sensor 123*b*. Fixing the main thermostat 121*a* and the sub-thermostat 121*b* by snap-fitting enables easily assembling the main thermostat 121*a* and the sub-thermostat 121*b* to the bottom cover 100*a* with an inexpensive configuration. In any cases, a part of the main thermostat 121*a* and a part of the sub-thermostat 121*b* are on the outer face of the fixing device 100.

Figure 7:
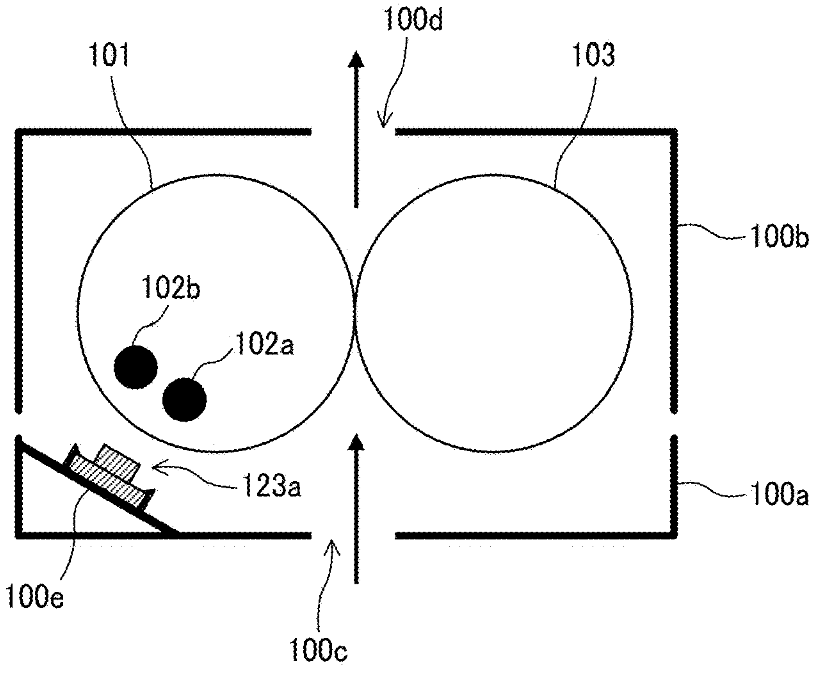
FIG. 7 is a diagram illustrating a schematic configuration of a fixing device according to a comparative example.

FIG. 7 is a diagram illustrating a schematic configuration of the fixing device according to a comparative example.

As illustrated in FIG. 7, the fixing device according to the comparative example includes an assembled portion 100*e* inside the bottom cover 100*a*. The main thermostat 121*a*, the sub-thermostat 121*b*, the main temperature sensor 123*a*, and the sub-temperature sensor 123*b* (in the following description, these are referred to as the temperature responsive elements) in the power interrupter 120 are assembled to the assembled portion 100*e*.

There is a case in which at least one of temperature responsive elements of the power interrupter 120 is not properly assembled to the assembled portion 100*e*. For example, a worker may forget to tighten the screw, or the elastic fastener may be broken. In a structure of the comparative example illustrated in FIG. 7, it is not possible to confirm whether the temperature responsive elements of the power interrupter are properly assembled to the assembled portion 100*e* in a final check before the shipment of the fixing device. The temperature responsive element of the power interrupter 120 that is not properly assembled cannot correctly detect the surface temperature of the fixing belt and may not cut off the power supply to the heater even if the temperature of the fixing belt becomes equal to or higher than the predetermined temperature.

In contrast, the main thermostat 121*a*, the sub-thermostat 121*b*, the main temperature sensor 123*a*, and the sub-temperature sensor 123*b* that are temperature responsive elements of the power interrupter 120 in the present embodiment are assembled to the bottom cover of the fixing device so as to be exposed to the outside of the fixing device 100. Accordingly, it is possible to visually confirm whether the main thermostat 121*a*, the sub-thermostat 121*b*, the main temperature sensor 123*a*, and the sub-temperature sensor 123*b* in the power interrupter 120 are correctly assembled after the fixing device is assembled (in other words, without removing the bottom cover 100*a*).

In addition, the main thermostat 121*a*, the sub-thermostat 121*b*, the main temperature sensor 123*a*, and the sub-temperature sensor 123*b* in the power interrupter 120 can be attached to and detached from the fixing device without removing the bottom cover 100*a*. The above-described structure enables reassembling the temperature responsive element that is at least one of the temperature responsive elements not properly assembled without removing the bottom cover 100*a*.

In addition, the above-described structure enables replacement of the main thermostat 121*a*, the sub-thermostat 121*b*, the main temperature sensor 123*a*, and the sub-temperature sensor 123*b* in the power interrupter 120 without removing the bottom cover 100*a*. As a result, replacement workability can be enhanced.

The elastic fastener 133 for snap-fitting and fixing the main temperature sensor 123*a* and the sub-temperature sensor 123*b* is projected from the outer face of the bottom cover 100*a* and has a root exposed to the outside of the fixing device. The root of the elastic fastener 133 is most likely to be broken when the temperature sensor is assembled.

The elastic fastener 133 having the root exposed in the present embodiment enables confirming the root of the elastic fastener 133 without removing the bottom cover 100*a* and easily finding breakage of the elastic fastener 133.

The bottom cover 100*a* in the present embodiment has a structure to assemble the main thermostat 121*a*, the sub-thermostat 121*b*, the main temperature sensor 123*a*, and the sub-temperature sensor 123*b* in the power interrupter 120 to the bottom cover 100*a*. The number of components in the above-described structure is smaller than the number of components in a structure including components to assemble the main thermostat 121*a*, the sub-thermostat 121*b*, the main temperature sensor 123*a*, and the sub-temperature sensor 123*b* in the power interrupter 120 to the bottom cover. As a result, the cost of the fixing device can be reduced.

In the present embodiment, the main temperature sensor 123*a* and the sub-temperature sensor 123*b* that are exposed to the outside of the fixing device are easily affected by ambient temperature and may not detect temperature with high accuracy due to the influence of the ambient temperature. To take countermeasures against the influence of the ambient temperature, in the present embodiment, thermistors with temperature compensation functions are used as the main temperature sensor 123*a* and the sub-temperature sensor 123*b*. The thermistor with the temperature compensation function includes a detection unit to detect the surface temperature of the fixing belt and a compensation detection unit to detect the ambient temperature around the thermistor. A signal detected and output by the detection unit, corresponding to the temperature of the fixing belt, and including an error due to the ambient temperature is corrected based on a compensation output signal corresponding to the ambient temperature detected by the compensation detection unit. Specifically, a control circuit of the temperature sensor corrects the signal detected and output by the detection unit and corresponding to the temperature of the fixing belt based on the compensation output signal corresponding to the ambient temperature detected by the compensation detection unit.

As a result, although the main temperature sensor 123*a* and the sub-temperature sensor 123*b* are exposed to the outside, the main temperature sensor 123*a* and the sub-temperature sensor 123*b* can accurately detect the temperature of the fixing belt.

Alternatively, the temperature sensor may output the signal detected and output by the detection unit and the compensation output signal to the controller 124, and the controller 124 may specify the temperature of the fixing belt based on the signal detected and output by the detection unit and the compensation output signal.

The fixing device according to a modification of the present embodiment is described below.

A first modification is described below.

Figure 8A:
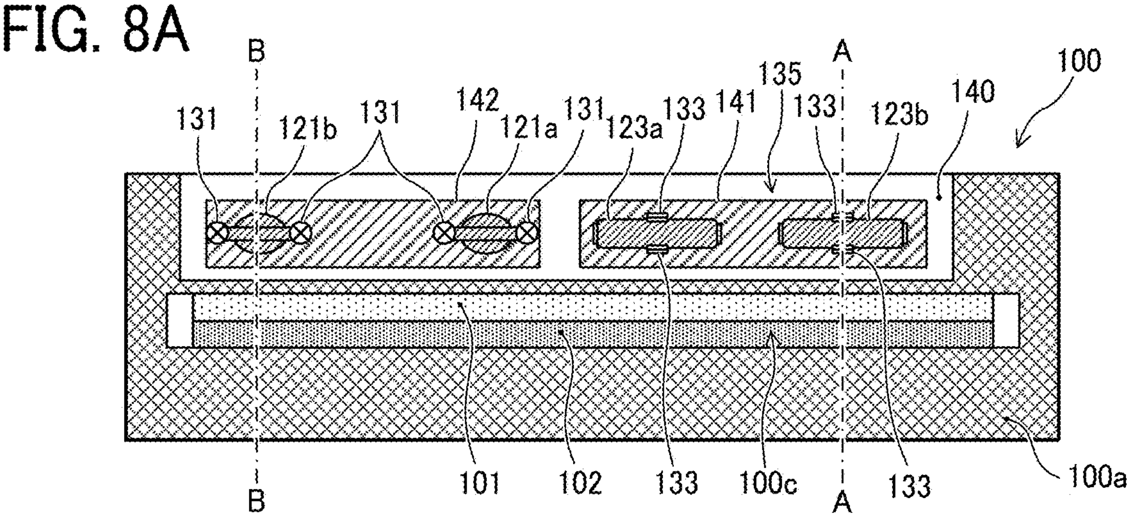
FIG. 8A is a bottom view of a fixing device according to a first modification.
Figure 8B:
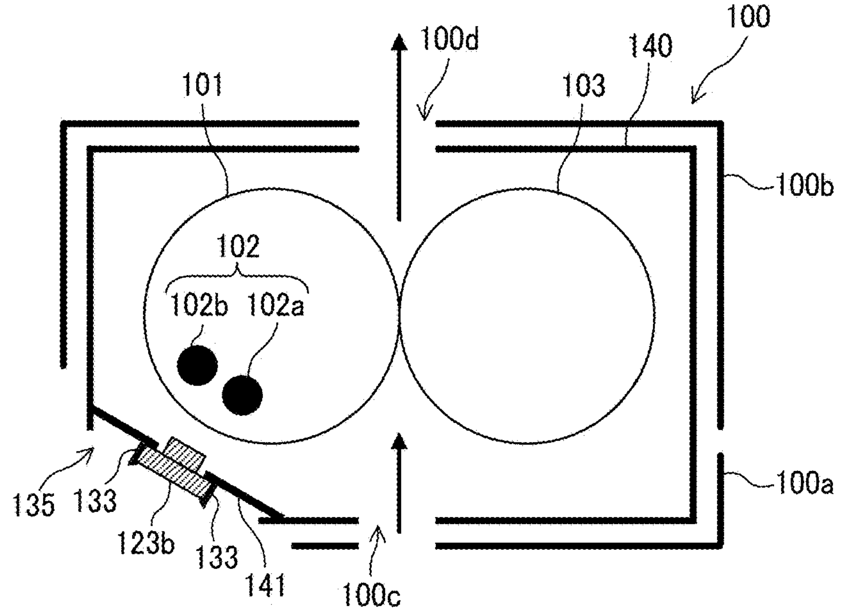
FIG. 8B is a cross-sectional view of the fixing device, taken along a line A-A in FIG. 8A.
Figure 8C:
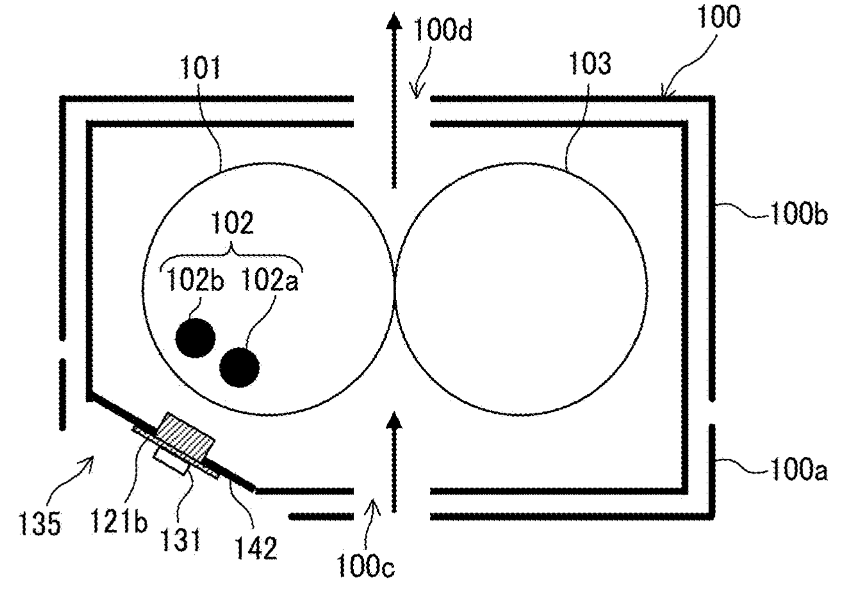
FIG. 8C is a cross-sectional view of the fixing device, taken along a line B-B in FIG. 8A.

FIG. 8A is a bottom view of the fixing device according to the first modification. FIG. 8B is a cross-sectional view of the fixing device, taken along a line A-A in FIG. 8A. FIG. 8C is a cross-sectional view of the fixing device, taken along a line B-B in FIG. 8A.

The fixing device 100 according to the first modification illustrated in FIG. 8 includes a metal frame 140 made of a metal plate. The metal frame 140 holds the pressure roller 103 and other components. The top cover 100*b* and the bottom cover 100*a* are assembled to the metal frame 140. Since the metal frame 140 has higher rigidity than resin, the metal frame 140 holding the pressure roller 103 and other components can enhance a positional accuracy of the components. Since the metal frame 140 has high thermal conductivity, the top cover 100*b* and the bottom cover 100*a* cover the metal frame 140 as much as possible from the viewpoint of preventing the temperature in the image forming apparatus from rising.

The fixing device according to the first modification includes a first element holding plate 141 made of resin and assembled to the metal frame 140 to hold the main temperature sensor 123*a* and the sub-temperature sensor 123*b* in the power interrupter 120. The fixing device according to the first modification also includes a second element holding plate 142 made of resin and assembled to the metal frame 140 to hold the main thermostat 121*a* and the sub-thermostat 121*b* in the power interrupter 120.

The first element holding plate 141 includes a pair of elastic fasteners 133 for fixing the main temperature sensor 123*a* by snap-fitting and a pair of elastic fasteners 133 for fixing the sub-temperature sensor 123*b* by snap-fitting. Similar to the present embodiment, the elastic fasteners 133 are formed on the first element holding plate 141 so that the roots of the elastic fasteners are exposed to the outside of the fixing device. The main temperature sensor 123*a* and the sub-temperature sensor 123*b* are held by the first element holding plate 141 by snap-fitting.

The second element holding plate 142 has a pair of screw holes for screwing the main thermostat 121*a* and a pair of screw holes for screwing the sub-thermostat 121*b*. A pair of screws 131 fastens each of the main thermostat 121*a* and the sub-thermostat 121*b* to the second element holding plate 142, and the second element holding plate 142 holds the main thermostat 121*a* and the sub-thermostat 121*b*.

The first element holding plate 141 is preferably made of resin so that the elastic fasteners can be easily elastically deformed. On the other hand, the main thermostat 121*a* and the sub-thermostat 121*b* may be directly fastened to the metal frame 140 by screws, and the second element holding plate 142 may be omitted. However, it is preferable to use the second element holding plate 142 made of resin because the insulation property can be easily enhanced.

Disposing the metal frame 140 in the fixing device and assembling the temperature responsive elements such as the main temperature sensor 123*a*, the sub-temperature sensor 123*b*, the main thermostat 121*a*, and the sub-thermostat 121*b* in the power interrupter 120 to the metal frame 140 via the first element holding plate 141 and the second element holding plate 142 as described above give the following advantages. The metal frame 140 enhances the rigidity of the fixing device. In addition, the metal frame 140 enhances the accuracy of a gap between the fixing belt 101 and each of the temperature responsive elements such as the main thermostat 121*a*, the sub-thermostat 121*b*, the main temperature sensor 123*a*, and the sub-temperature sensor 123*b* in the power interrupter 120.

The bottom cover 100*a* has an opening 135 to expose the main thermostat 121*a* and the sub-thermostat 121*b* that are assembled to the second element holding plate 142 and the main temperature sensor 123*a* and the sub-temperature sensor 123*b* that are assembled to the first element holding plate 141 to the outside of the fixing device. The opening 135 enables the main thermostat 121*a* and the sub-thermostat 121*b* that are assembled to the second element holding plate 142 and the main temperature sensor 123*a* and the sub-temperature sensor 123*b* that are assembled to the first element holding plate 141 to be attached to and detached from the first element holding plate 141 or the second element holding plate 142 through the opening 135 of the bottom cover 100*a*. Similar to the present embodiment, the above-described structure enables replacement of the main thermostat 121*a*, the sub-thermostat 121*b*, the main temperature sensor 123*a*, and the sub-temperature sensor 123*b* in the power interrupter 120 without removing the bottom cover 100*a*. As a result, replacement workability can be enhanced.

The above-described structure enables visually confirming through the opening 135 whether the main thermostat 121*a*, the sub-thermostat 121*b*, the main temperature sensor 123*a*, and the sub-temperature sensor 123*b* in the power interrupter 120 are correctly assembled after the fixing device is assembled. Similar to the present embodiment, the above-described structure enables visually confirming whether the main thermostat 121*a*, the sub-thermostat 121*b*, the main temperature sensor 123*a*, and the sub-temperature sensor 123*b* in the power interrupter 120 are correctly assembled without removing the bottom cover 100*a*. In addition, the above-described structure enables confirming whether the elastic fasteners 133 are not broken without removing the bottom cover 100*a*.

A second modification is described below.

Figure 9A:
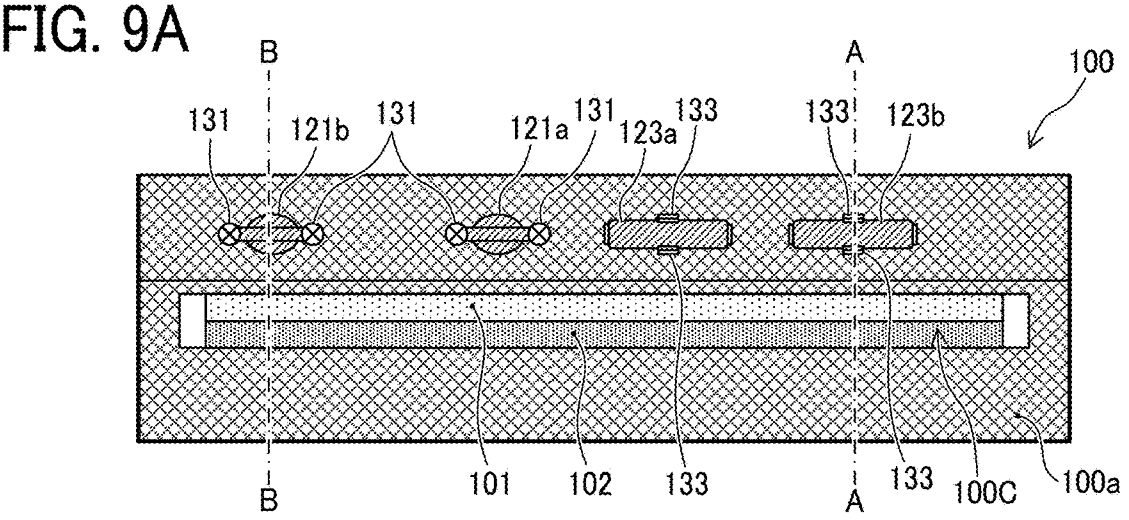
FIG. 9A is a bottom view of a fixing device according to a first modification.
Figure 9B:
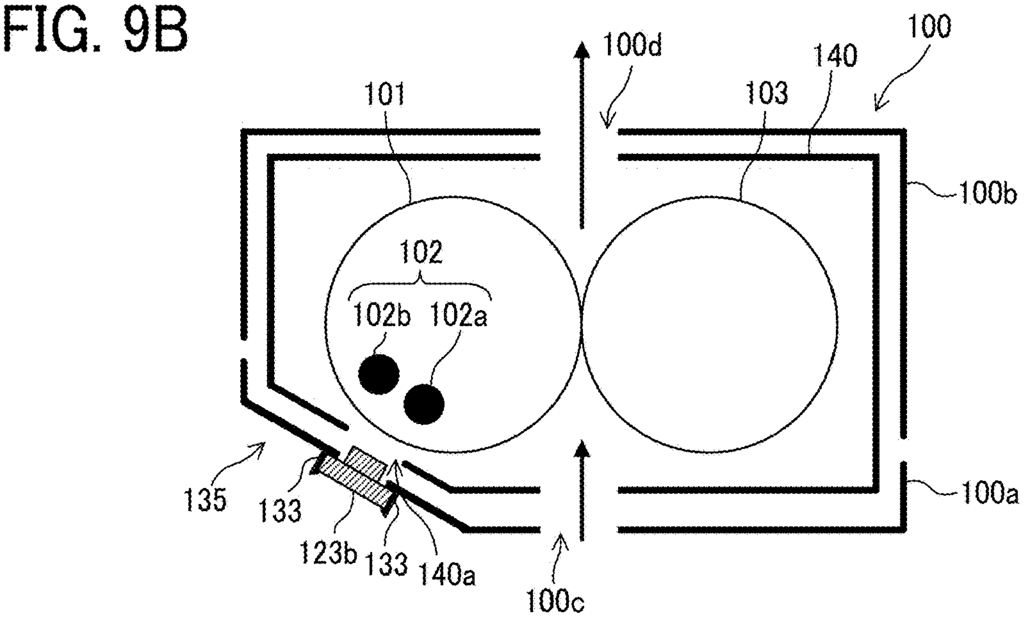
FIG. 9B is a cross-sectional view of the fixing device, taken along a line A-A in FIG. 9A.
Figure 9C:
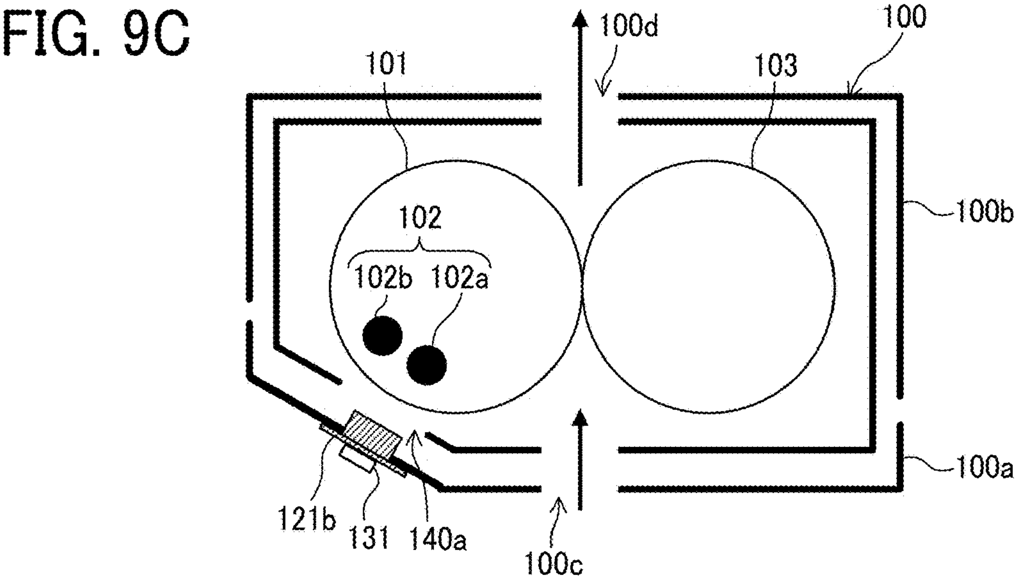
FIG. 9C is a cross-sectional view of the fixing device, taken along a line B-B in FIG. 9A.

FIG. 9A is a bottom view of the fixing device according to the second modification. FIG. 9B is a cross-sectional view of the fixing device, taken along a line A-A in FIG. 9A. FIG. 9C is a cross-sectional view of the fixing device, taken along a line B-B in FIG. 9A.

In the second modification, temperature responsive elements in the power interrupter 120 (that are the main thermostat 121*a*, the sub-thermostat 121*b*, the main temperature sensor 123*a*, and the sub-temperature sensor 123*b*) are attached to the bottom cover 100*a* similarly to the present embodiment. In the second modification, the metal frame 140 has a sensing opening 140*a* through which the temperature responsive elements detect the temperatures of the fixing belt.

Since the fixing device according to the second modification does not include the first element holding plate 141 and the second element holding plate 142, the number of components can be reduced as compared with the first modification, and an increase in the cost of the fixing device can be reduced as compared with the first modification.

A third modification is described below.

Figure 10A:
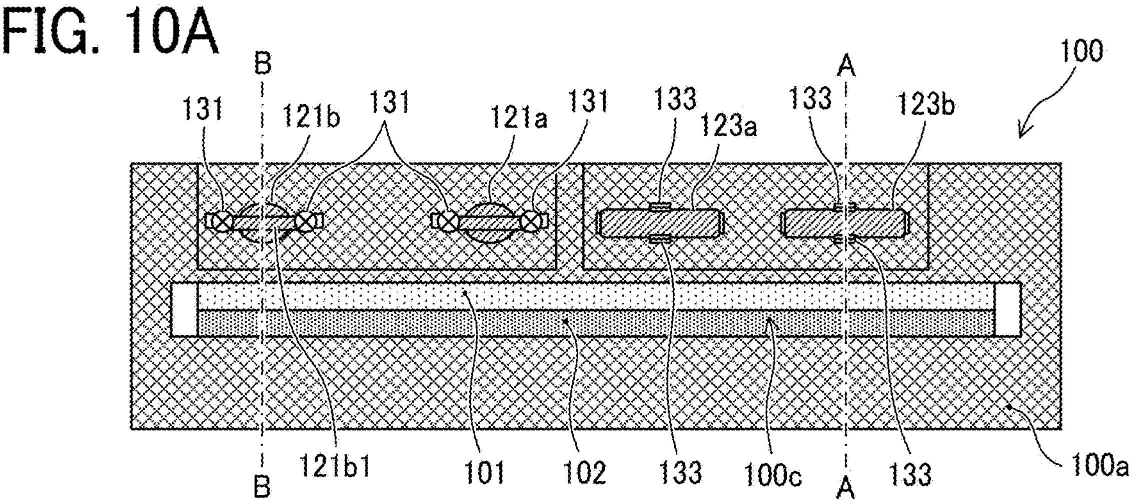
FIG. 10A is a bottom view of a fixing device according to a first modification.
Figure 10B:
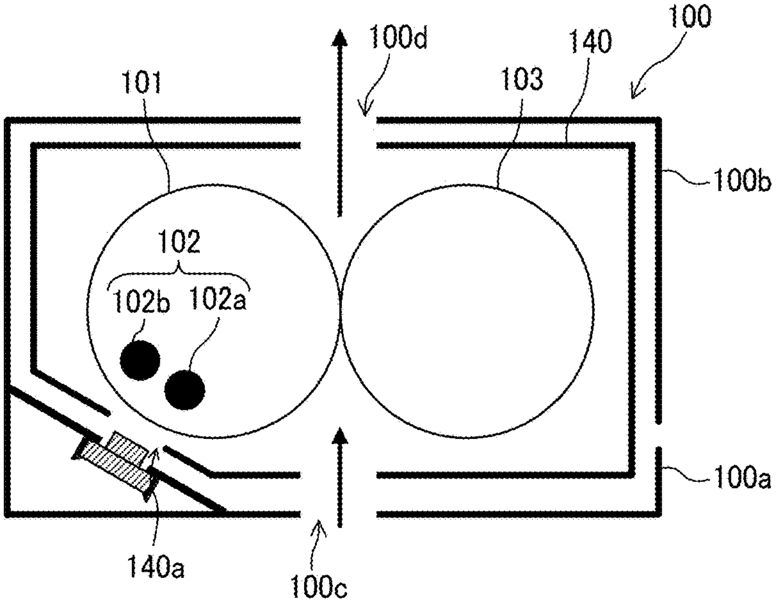
FIG. 10B is a cross-sectional view of the fixing device, taken along a line A-A in FIG. 10A.
Figure 10C:
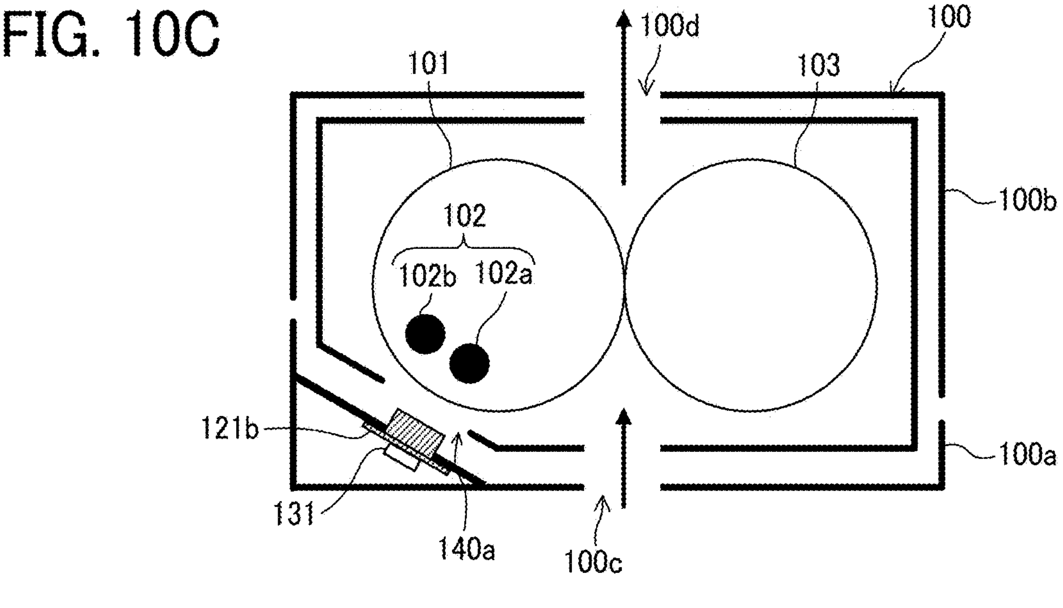
FIG. 10C is a cross-sectional view of the fixing device, taken along a line B-B in FIG. 10A.

FIG. 10A is a bottom view of the fixing device according to the third modification. FIG. 10B is a cross-sectional view of the fixing device, taken along a line A-A in FIG. 10A. FIG. 10C is a cross-sectional view of the fixing device, taken along a line B-B in FIG. 10A.

In the third modification, the bottom cover 100*a* has a recessed portion to which the main temperature sensor 123*a* and the sub-temperature sensor 123*b* of the power interrupter 120 are assembled and a recessed portion to which the main thermostat 121*a* and the sub-thermostat 121*b* of the power interrupter 120 are assembled. The above-described structure can prevent the main temperature sensor 123*a*, the sub-temperature sensor 123*b*, the main thermostat 121*a*, the sub-thermostat 121*b*, and the elastic fasteners 133 of the power interrupter 120 from colliding with an object when the fixing device is assembled to and removed from the main body of the image forming apparatus. Accordingly, the above-described structure can prevent the main temperature sensor 123*a*, the sub-temperature sensor 123*b*, the main thermostat 121*a*, the sub-thermostat 121*b*, and the elastic fasteners 133 from being damaged when the fixing device is assembled to and removed from the main body of the image forming apparatus.

Although the above-described fixing device in the third modification includes the metal frame 140, the fixing device in the third modification may not include the metal frame 140 as illustrated in FIGS. 4A to 4C.

The above-described embodiments are illustrative and do not limit this disclosure. Thus, numerous additional modifications and variations are possible in light of the above teachings. For example, elements and/or features of different illustrative embodiments may be combined with each other and/or substituted for each other within the scope of this disclosure.

The configurations according to the above-descried embodiments are examples, and embodiments of the present disclosure are not limited to the above. For example, the following aspects can achieve effects described below.

First Aspect

In a first aspect, a fixing device such as the fixing device 100 includes a fixing rotator such as the fixing belt 101, a pressure rotator such as the pressure roller 103, a heater such as the heater 102*a* or 102*b*, a temperature responsive element such as the temperature sensor or the thermostat, and a fastener such as the elastic fastener 133. The pressure rotator presses the fixing rotator to form a fixing nip between the fixing rotator and the pressure rotator. The heater heats the fixing rotator. The temperature responsive element is exposed outside the fixing device and fixed to the fastener. The fastener is exposed outside the fixing device.

According to the first aspect, as described in the present embodiment, the temperature responsive element and the fastener that are exposed to the outside of the fixing device enable easily confirming assembled states of the temperature responsive element.

Second Aspect

In a second aspect, the fixing device according to the first aspect further includes multiple temperature responsive elements including the temperature responsive element, and at least one of the multiple temperature responsive elements includes a thermostat such as the main thermostat 121*a* or the sub-thermostat 121*b* to cut off power supply to the heater in response to a temperature of the fixing rotator such as the fixing belt 101 equal to or higher than a predetermined temperature.

As described in the present embodiment, the structure according the second aspect enables easily confirming an assembled state of the thermostat. As a result, the structure according to the second aspect can prevent a situation in which the thermostat not correctly assembled does not cut off the power supply to the heater even after the temperature of the fixing rotator such as the fixing belt 101 becomes equal to or higher than the predetermined temperature.

Third Aspect

In a third aspect, the fixing device according to the first aspect or the second aspect further includes multiple temperature responsive elements including the temperature responsive element, and at least one of the multiple temperature responsive is a temperature sensor to output a signal corresponding to a temperature of the fixing rotator such as the fixing belt 101.

As described in the present embodiment, the structure according the third aspect enables easily confirming an assembled state of the temperature sensor. As a result, the structure according to the third aspect can prevent a situation in which the temperature sensor not correctly assembled does not accurately detect the temperature of the fixing rotator such as the fixing belt 101.

Fourth Aspect

In a fourth aspect, the fixing device according to the third aspect further includes a protector to cut off power supply to the heater based on the signal output from the temperature sensor.

As described in the present embodiment, the structure according to the fourth aspect can prevent a situation in which the temperature sensor not correctly assembled does not cut off the power supply to the heater even after the temperature of the fixing rotator such as the fixing belt 101 becomes equal to or higher than the predetermined temperature.

In addition, the protector to cut off the power supply to the heater based on the signal of the temperature sensor can cut off the power supply to the heater faster than the thermostat when the fixing rotator has an abnormal temperature as described in the present embodiment. As a result, even in an energy-saving type fixing device having a small thermal capacity, the protector in the fourth aspect can cut off the power supply to the heater before the temperature of the fixing belt 101 reaches an abnormally high temperature.

Fifth Aspect

In a fifth aspect, the fixing device according to any one of the first to fourth aspects further includes multiple temperature responsive elements including the temperature responsive element and multiple fasteners including the fastener. The multiple temperature responsive elements are respectively fixed to the multiple fasteners, and at least one of the multiple fasteners is on an outer face of the fixing device. As described in the present embodiment, the structure in the fifth aspect enables reassembling the temperature responsive element without disassembling the fixing device including the temperature responsive element not correctly assembled. In addition, the structure in the fifth aspect enables replacing the temperature responsive element without disassembling the fixing device, which enhances replacement workability.

Sixth Aspect

In a sixth aspect, the fixing device according to any one of the first to fifth aspects further includes an elastic fastener to fix the temperature responsive element on an outer face of the fixing device by snap-fitting.

As described in the present embodiment, the structure in the sixth aspect is inexpensive and enables easily assembling the temperature responsive element to the fixing device.

Seventh Aspect

In a seventh aspect, a root of the elastic fastener such as the elastic fastener 133 in the fixing device according to the sixth aspect is exposed outside the fixing device.

As described in the present embodiment, the structure in the seventh aspect enables confirming the root of the elastic fastener that is easily broken such as the elastic fastener 133 without disassembling the fixing device. As a result, the structure in the seventh aspect enables easily finding the temperature responsive element abnormally assembled due to breakage of the elastic fastener.

Eighth Aspect

In an eighth aspect, the fixing device according to any one of the first to seventh aspects further includes a cover such as the bottom cover 100*a* covering the fixing rotator such as the fixing belt 101 and the pressure rotator such as the pressure roller 103, and the fastener is on the cover to fix the temperature responsive element on the cover.

According to the eighth aspect, the temperature responsive element can be assembled to the fixing device so as to be exposed to the outside of the fixing device.

Ninth Aspect

In a ninth aspect, the fixing device according to any one of the first to eighth aspects further includes multiple temperature responsive elements including the temperature responsive element and multiple protectors including the multiple temperature responsive elements, respectively. The multiple protectors respectively cut off power supply to the heater in response to a temperature of the fixing rotator equal to or higher than a predetermined temperature.

According to the ninth aspect, as described in the present embodiment, one of the multiple protectors can cut off the power supply to the heater in response to the temperature of the fixing rotator such as the fixing belt equal to or higher than the predetermined temperature even if the other one of the multiple protectors fails.

Tenth Aspect

In a tenth aspect, the multiple temperature responsive elements in the fixing device according to the ninth aspect include a thermostat to cut off the power supply to the heater in response to the temperature of the fixing rotator such as the fixing belt 101 equal to or higher than the predetermined temperature and a temperature sensor to output a signal corresponding to the temperature of the fixing rotator.

The above-described structure according to the tenth aspect can cut off the power supply to the heater after the temperature of the fixing rotator reaches or exceeds the predetermined temperature.

Eleventh Aspect

In an eleventh aspect, an image forming apparatus includes an image forming section to form an image on a recording medium and the fixing device according to any one of the first to the tenth aspects to fix the image onto the recording medium.

In the image forming apparatus according to the eleventh aspect, as described in the present embodiment, the multiple temperature responsive elements exposed to the outside of the fixing device enable easily confirming assembled states of the multiple temperature responsive elements.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A fixing device comprising:

a fixing rotator;

a pressure rotator to press the fixing rotator to form a fixing nip between the fixing rotator and the pressure rotator;

a heater to heat the fixing rotator;

a temperature responsive element exposed outside the fixing device; and a fastener to which the temperature responsive element is fixed, the fastener exposed outside the fixing device, wherein the fastener includes at least one elastic fastener to fix the temperature responsive element on an outer face of the fixing device by snap-fitting directly on an outer corner of the temperature responsive element.

2. The fixing device according to claim 1, further comprising multiple temperature responsive elements including the temperature responsive element, wherein at least one of the multiple temperature responsive elements includes a thermostat to cut off power supply to the heater in response to a temperature of the fixing rotator equal to or higher than a predetermined temperature.

3. The fixing device according to claim 1, further comprising multiple temperature responsive elements including the temperature responsive element, wherein at least one of the multiple temperature responsive elements includes a temperature sensor to output a signal corresponding to a temperature of the fixing rotator.

4. The fixing device according to claim 3, further comprising a protector to cut off power supply to the heater based on the signal output from the temperature sensor.

5. The fixing device according to claim 1, further comprising:

multiple temperature responsive elements including the temperature responsive element; and multiple fasteners including the fastener, the multiple temperature responsive elements respectively fixed to the multiple fasteners, wherein at least one of the multiple fasteners is on the outer face of the fixing device.

6. The fixing device according to claim 1, wherein a root of the at least one elastic fastener is exposed outside the fixing device.

7. The fixing device according to claim 1, further comprising a cover covering the fixing rotator and the pressure rotator, wherein the fastener is on the cover to fix the temperature responsive element on the cover.

8. The fixing device according to claim 1, further comprising:

multiple temperature responsive elements including the temperature responsive element, and multiple protectors including the multiple temperature responsive elements, respectively, wherein the multiple protectors respectively cut off power supply to the heater in response to a temperature of the fixing rotator equal to or higher than a predetermined temperature.

9. The fixing device according to claim 8, wherein the multiple temperature responsive elements include:

a thermostat to cut off the power supply to the heater in response to the temperature of the fixing rotator equal to or higher than the predetermined temperature and a temperature sensor to output a signal corresponding to the temperature of the fixing rotator.

10. An image forming apparatus comprising:

an image forming section to form an image on a recording medium, and the fixing device according to claim 1 to fix the image onto the recording medium.

11. The fixing device according to claim 1, wherein the at least one elastic fastener includes at least one inward facing claw at a tip thereof, the at least one claw holding an outer side of the temperature responsive element at the outer corner of the temperature responsive element.

12. The fixing device according to claim 11, wherein:

the at least one inward facing claw includes two inward facing claws, and there is a space between the two inward facing claws.

13. The fixing device according to claim 1, wherein:

the at least one elastic fastener includes two elastic fasteners on opposite sides of the temperature responsive element, and the two elastic fasteners extend along and contact the opposite sides of the temperature responsive element.

* * * * *